United States Patent [19]

Treseder

[11] 4,272,181

[45] Jun. 9, 1981

[54] ELECTROPHOTOGRAPHIC PRINTER WITH DUPLEX PRINTED SHEET OUTPUT

[75] Inventor: Robert C. Treseder, Aptos, Calif.

[73] Assignee: International Business Machines Corporation, Armonk, N.Y.

[21] Appl. No.: 974,585

[22] Filed: Dec. 29, 1978

[51] Int. Cl.³ .................. G03G 15/00; B65H 29/00
[52] U.S. Cl. ........................ 355/14 SH; 271/186; 355/3 SH
[58] Field of Search ................ 355/3 R, 3 SH, 14 R, 355/14 SH, 23, 24, 26; 271/65, 186, 195, 196, DIG. 9

[56] References Cited

U.S. PATENT DOCUMENTS

| | | | |
|---|---|---|---|
| 2,752,154 | 6/1956 | Nelson | 271/196 |
| 2,862,707 | 12/1958 | Voysey | 271/196 X |
| 3,141,667 | 7/1964 | Novick | 271/186 X |
| 3,615,129 | 10/1971 | Drawe et al. | 355/26 X |
| 3,788,636 | 1/1974 | Rehm et al. | 271/196 X |
| 4,095,979 | 6/1978 | DiFrancesco et al. | 355/24 X |
| 4,129,377 | 12/1978 | Miyamoto et al. | 355/14 SH |

*Primary Examiner*—Fred L. Braun
*Attorney, Agent, or Firm*—Otto Schmid, Jr.

[57] ABSTRACT

Printing apparatus for producing collated sets of duplex printed sheets. The apparatus includes an input sheet feed path for feeding sheets to an electrophotographic imaging apparatus to print one side of a print sheet and an output sheet feed path to feed the sheet from the imaging apparatus to an output stacker. A duplexing sheet feed path can be selectively actuated to divert the sheet from the output path to flip the sheet as the sheet is continuously fed back to the input sheet feed path to print the image on the other side of the sheet. The apparatus is designed to print a plurality of sheet sizes by selective control of pressure and vacuum forces.

14 Claims, 9 Drawing Figures

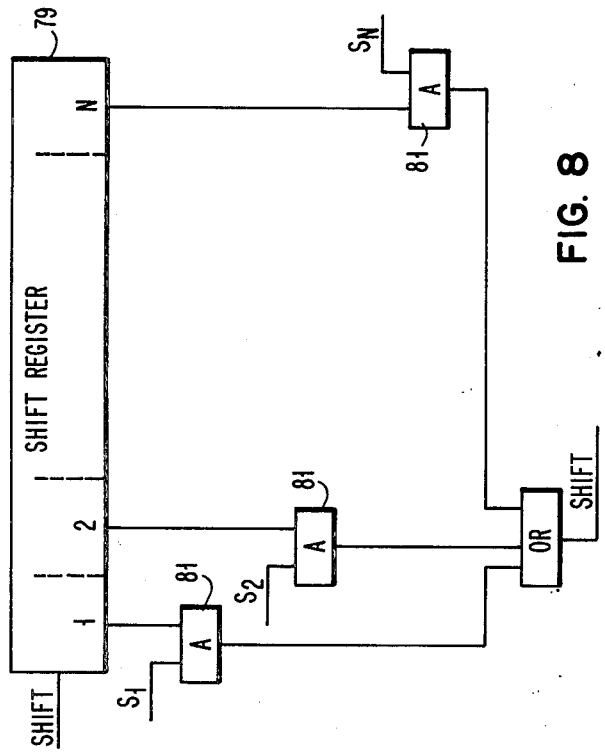
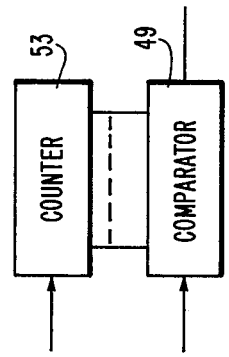
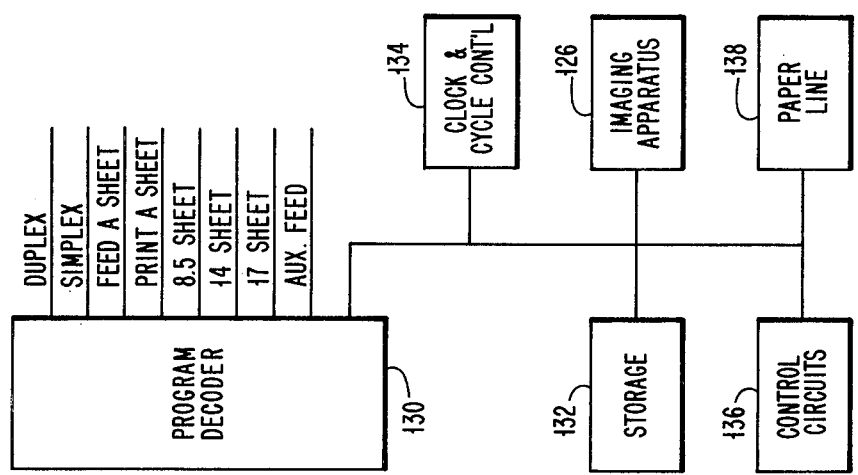

ELECTROPHOTOGRAPHIC PRINTER WITH DUPLEX PRINTED SHEET OUTPUT

BACKGROUND OF THE INVENTION

The present invention relates to printers and more particularly to printers which provide pre-collated duplex sheet output.

Printing is an important part of data processing systems for producing various reports and documents required for business. It is desirable that these reports or documents be printed on both sides of the page to produce a resultant savings in paper costs and a reduction in bulk of the individual report or document.

It has not been possible in the prior art to produce reports printed on both sides of the sheet (duplex printing) in a printer operating on-line with a data processing system. Recent advances in copier technology have made it easier and more economical to copy on both sides of the sheet. However, this represents a post-processing step for documents printed in a data processing system. One prime requirement for a duplex printer operating on-line with a data processing system is high throughout since the cost of processor time is relatively high and a printer which minimizes the processor time is to be desired. The copier systems are not suitable for incorporation into a printer since one of these systems duplexes only one sheet at a time which would be detrimental to printer throughput. A second system involves handling of printed sheets and/or originals from one position to another in the system which is detrimental to throughput and may also require operator attention.

SUMMARY OF THE INVENTION

It is therefore the primary object of this invention to provide a printer suitable for operation on-line with a data processing system which produces collated sets of duplex printed sheets.

Briefly, according to the invention, there is provided an electrophotographic printer capable of producing collated sets comprising sheets of documents printed on both sides. The apparatus comprises an input sheet feed path which is controllable to feed sheets to a gate member which registers the sheet in a predetermined position suitable for movement to the electrophotographic drum to receive the developed image of a printed page from the drum at the transfer station. The sheet is separated from the drum and transported to the fusing station to fix and permanently fuse the image to the sheet. The sheet is then transported toward a sheet sensor device which detects the presence of the sheet at a predetermined position where a decision is made to transport the sheet to a duplexing feed path for printing on the other side of the sheet or to transport the sheet to a sheet output device such as a stacker. The sheet is reversed in the duplexing feed path and the duplex feed means feeds the sheet back to an intermediate position in the imput feed path so that the sheet can be registered and again moved to the electrophotographic drum to receive the developed image on the reverse side of the sheet. Control means are provided to produce signals to control the movement of the sheets through the printer in synchronism with the creation of the image to be printed on the sheet and to present these sheets in a predetermined sequence and orientation in the sheet output device.

BRIEF DESCRIPTION OF THE DRAWINGS

FIG. 3 is a schematic block diagram of the control means of the printing apparatus of FIG. 1;

FIG. 8 is a schematic block diagram of the sheet tracking apparatus;

FIG. 9 is a schematic block diagram of the duplex path control circuit.

DESCRIPTION OF THE PREFERRED EMBODIMENTS

Figure 2:
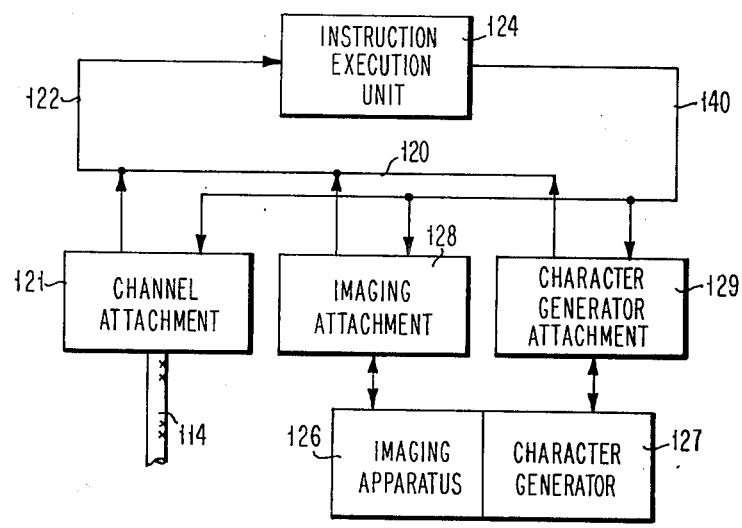
FIG. 2 is a block diagram of the basic components comprising the printing apparatus shown in FIG. 1.

The printer embodying the invention is suitable for operation on line with a data processing system to print data sent from the data processing system. As shown in FIG. 2, the printer comprises a native channel 120 coupled to the main channel 114 via a channel attachment 121 and providing appropriate interface between the main channel 114 and the printer. Data from the data processing unit is communicated over the main channel 114 to the channel attachment 121 where it is carried by a data in bus 122 within the native channel 120 to an instruction execution unit (IEU) 124. The data in bus 122 also provides data to the instruction execution unit 124 from imaging apparatus 126 and a character generator 127. The imaging apparatus 126 comprises apparatus responsive to a modulated laser scan for coating toner on the areas of a print drum discharged by the laser and transferring the toner onto paper. The imaging apparatus 126 is coupled to the native channel 120 via an imaging attachment 128, and the character generator 127 is coupled to the native channel 120 via a character generator attachment 129. Data at the output of the instruction execution unit 124 is carried by data and control out buses 130 to the character generator 127, the imaging apparatus 126 and the native channel 120.

Figure 1:
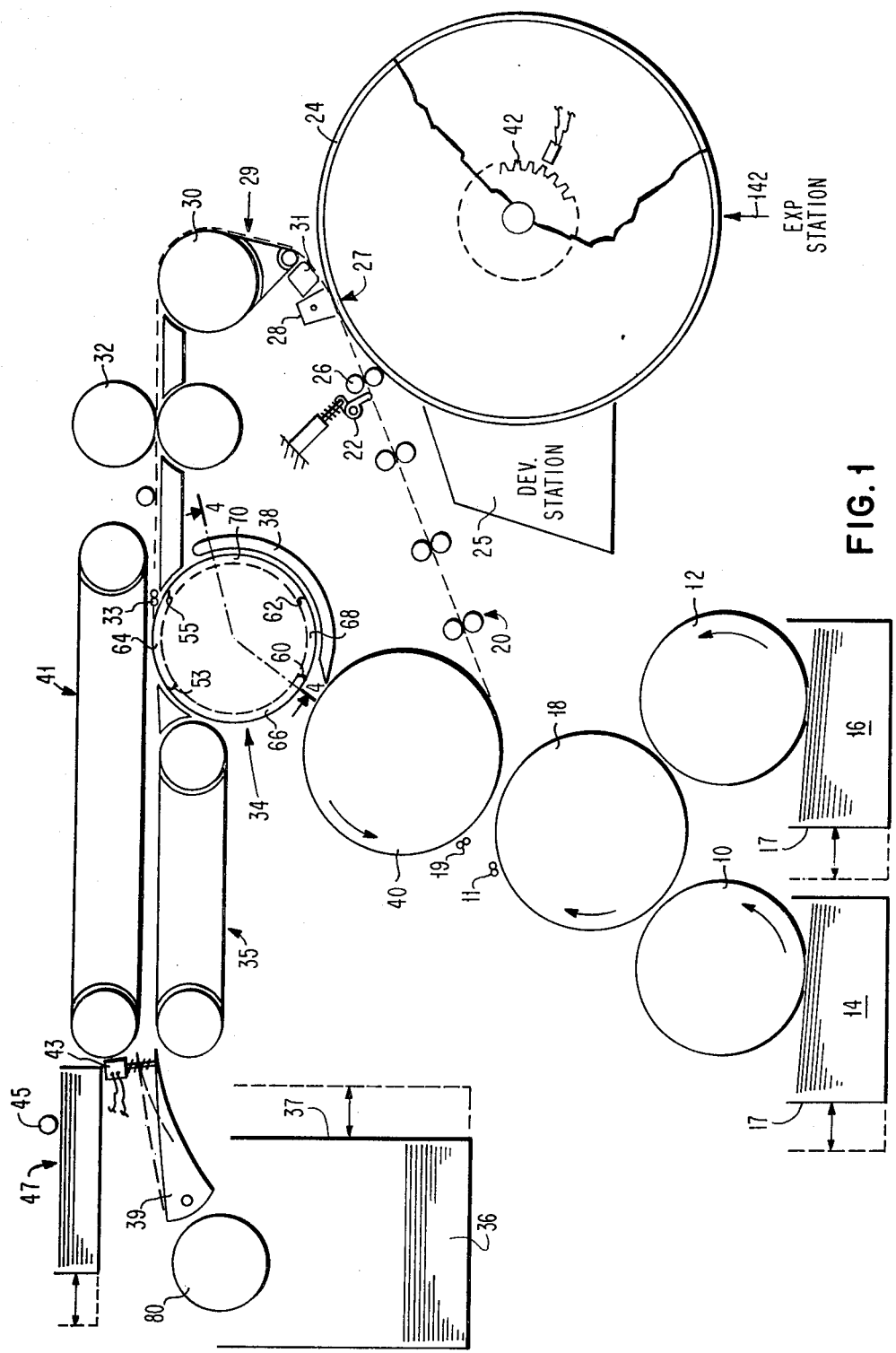
FIG. 1 is a diagrammatic front view of the printing apparatus embodying the invention having some parts cut away to more clearly show the apparatus.

In accordance with a preferred embodiment (FIG. 1), controlled vacuum and pressure forces are utilized to provide the required paper motion. The input sheet feed path includes two feed drums 10, 12, each operating with a separate sheet input stack 14, 16. Two input drums are provided so that one feed can be used and the paper in the other input can be replenished without interrupting the continuous operation of the printer. Each of the two feed drums 10, 12 is selectively actuable to feed a sheet to a registered position on a selectively actuated paper drum 18. The paper drum 18 feeds a sheet to an input paper path comprising a continuously running array of feed rolls 20 of conventional design which feeds the sheet to a gate member 22 for registration at a position near the electrophotograph drum 24. The gate member 22 is actuated to release the registered sheet and the sheet is fed by feed rolls 26 to the electrophotographic drum 24 in synchronism with the developed image on the drum so that the sheet and the image are properly overlaid in the transfer station where the image is transferred by the action of corona 28 to the sheet. The sheet is transported to the fuser station 32 by direction drum 30 and then to a position adjacent the duplex drum 34. When the sheet is in position at the duplex drum 34, a decision is made to either feed the sheet to the output stacker 36 or to feed the sheet through the duplex feed to print an image on the other side of the sheet. If duplexing is scheduled for the sheet, it is attracted to the duplex drum 34 and fed to a position adjacent the sheet flipper means 38 where the sheet is moved away from the drum 34 and then attached to and fed by the staging drum 40 back to the input feed for printing of the second side. Thus, the sheet is reversed by being flipped from side to side in the duplexing feed path.

The paper feed is selectively controlled by vacuum and pressure forces in response to control signals generated in response to the input requirements for the particular sheet and an indication of sheet presence at a predetermined position and sheet position indicating signals. The electrophotographic process is continuous and synchronous. For this reason, a timing device synchronized with the electrophotographic process is utilized to control the paper motion since it is necessary for the sheet to arrive at a precise time at the transfer station so that the developed image on the photoconductor will appear at the desired location on the sheet when the image is transferred to the sheet. In the embodiment shown the timing device comprises an emitter 42 attached to the same shaft as the photoconductor drum. The emitter 42 comprises a circular member having a plurality of spaced teeth members on its peripheral surface. When one of the teeth members is aligned with a magnetic pickup member, a low reluctance path is established and an electrical pulse is produced in the pickup circuit. The pulses are produced at a rate determined by the allowable tolerance for print line placement on the sheet and other timing considerations and this rate may be 720 pulses per circumferential inch of movement of the electrophotographic drum 24 for example.

Figure 4:
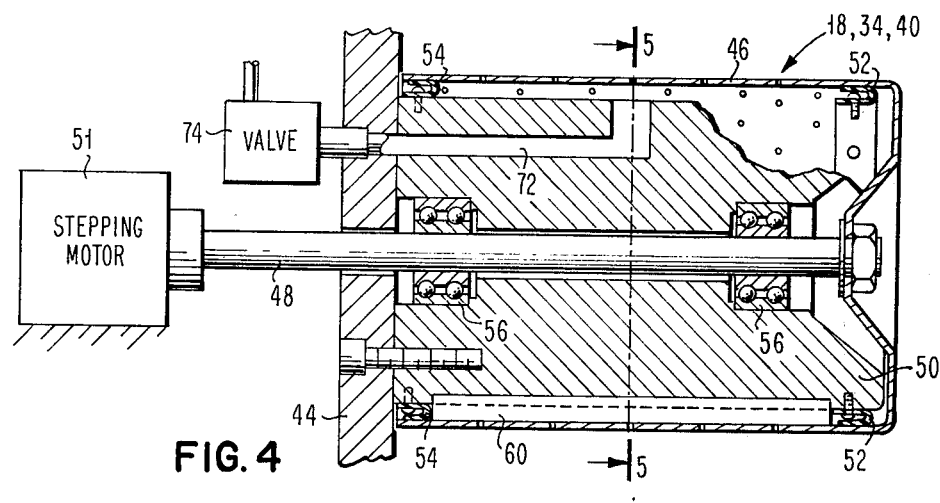
FIG. 4 is a cross-section view along lines 4—4 of FIG. 1 showing the duplex drum sheet feeding means.
Figure 5:
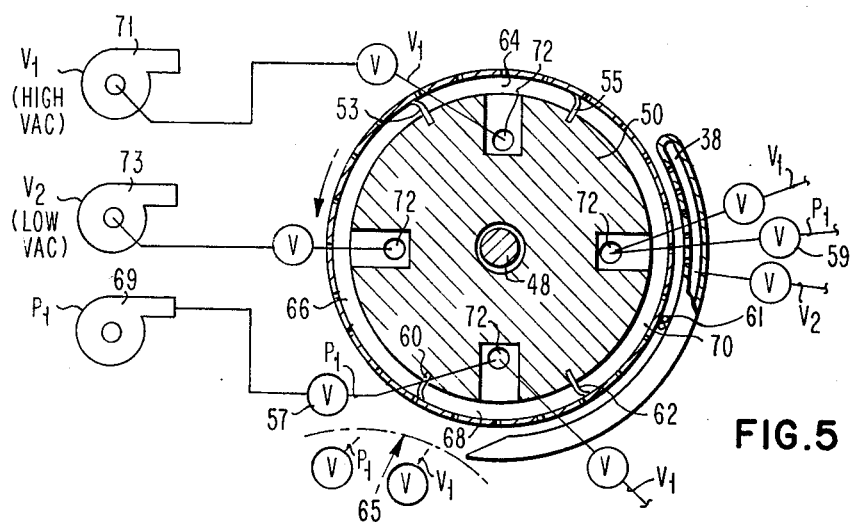
FIG. 5 is a cross-section view along lines 5—5 of FIG. 4.
Figure 7:
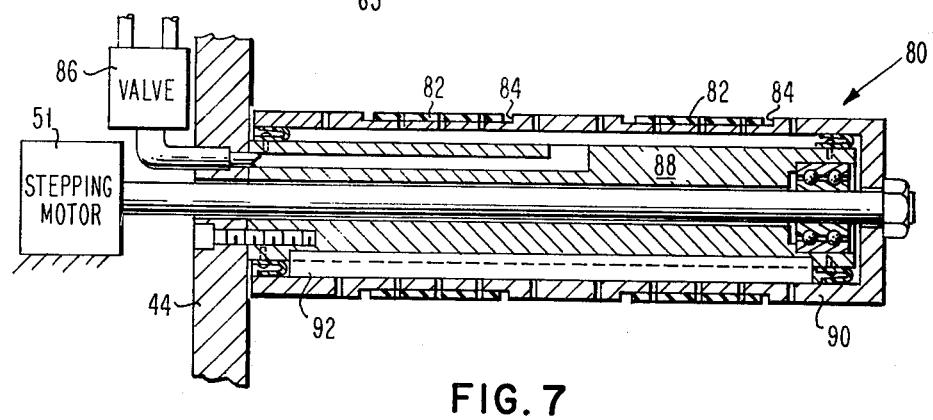
FIG. 7 is a section view taken along lines 7—7 of FIG. 6.

Each of the paper feed drums 18, 34, 40 is selectively actuable to feed sheets in response to control signals by controlling vacuum forces in the drum. In the embodiment shown, the components of the system are mounted on a support member 44 (FIG. 7) which extends vertically substantially the full height of the machine. The paper feed elements are mounted on the side of the support member toward the front of the machine while control elements and drive elements are located on the side of the support member toward the back of the machine. This arrangement facilitates entry to the paper line by the machine operator without the operator being exposed to possible danger from the drive elements and control elements. Duplex drum 34 is shown in detail in the drawings (FIGS. 4 and 5) and this structure is typical of the other paper control drums. The duplex drum comprises a hollow cylindrical outer member 46, having one end open and being cantilever mounted from the enclosed end from a shaft member 48, which extends through support member 44 and a stationary cylindrical member 50. Member 50 is positioned inside the hollow cylindrical member 46 and has a diameter slightly less than the hollow member 46 such as 0.1 inch, for example. Seal members 52, 54 are placed adjacent each end of the cylindrical member 46 to form a confined space between cylindrical member 46 and stationary control member 50.

Shaft 48 is supported by suitable bearings 56 for rotation about the axis common to both cylindrical member 46 and stationary control member 50. Suitable drive means are provided on shaft 48 to selectively drive the cylindrical member at a predetermined rotational speed. One suitable drive means comprises a stepping motor drive 51 such as that described in U.S. Pat. No. 3,463,985, issued Aug. 26, 1969 to T. R. Fredriksen. The confined space between cylindrical member 46 and stationary member 50 is divided into four sections 64, 66, 68, 70 so that the pressure to each of these sections can be controlled individually. The division is provided by wiper members 55, 53, 60, 62 which are fixed to control member 50 and extend into sealing relation with the inner surface of cylindrical member 46. The wiper members 55, 53, 60, 62 extend axially along the members 46, 50 between seals 52 and 54 to produce the plurality of substantially sealed compartments 64, 66, 68, 70 between members 46, 50 and an opening 72 is provided through support means 44 and cylindrical member 50 to each of the compartments. The pressure to each of the compartments is controlled by a suitable valve 57 coupled between a relatively high pressure source 69, a first relatively high vacuum source 71, or a second relatively low vacuum source 73, and each of the openings 72 by suitable pipes or hoses.

The outer cylindrical member is provided with a plurality of openings so that the pressure within each of the compartments can be communicated to the paper. The control pressures comprise a first relatively high pressure $P_1$ from source 69 such as 20 inches of water, for example, to move the sheet away from that section of the feed drum, a second relatively high vacuum level $V_1$ from source 71 such as $-20$ inches of water to attract the sheet to that section of the feed drum, and a third intermediate level of vacuum $V_2$ from source 73 such as $-5$ inches of water to retain a sheet that has been previously attracted to that or another section of the feed drum.

In the embodiment shown, the relatively high pressure source comprises a suitable centrifugal blower 69, the output of which is conducted to the control valves 57 by suitable pipes. The control valves 57 comprise any suitable valves which can be actuated relatively quickly to control the vacuum or pressure to one of the compartments 64, 66, 68, 70 in the drums 18, 34, 40, etc. such as a solenoid actuated poppet valve, for example. The relatively high vacuum source is also provided by a suitable centrifugal blower 71 and the intermediate vacuum level is provided by centrifugal blower 73.

Figure 6:
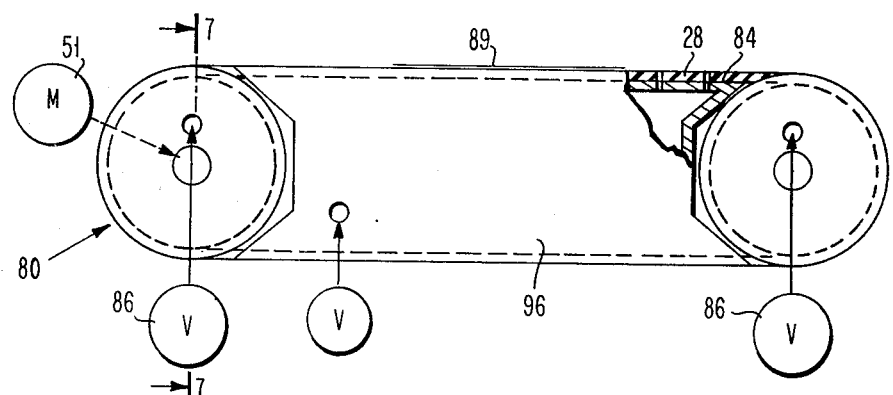
FIG. 6 is an end view of a belt roller sheet feed means.

The remainder of the sheet feed path, in addition to the paper feed drums, is provided with sheet feed means which is controllable by suitable pressure and vacuum forces. The sheet feed means shown in the specific embodiment of FIGS. 6 and 7 comprises a belt roller assembly. A roller 80 is provided at each end of the assembly and a plurality of belts 82 are provided which ride in grooves 84 so that they are at the same level as the roller surface. Each of the rollers 80 comprises a fixed cylindrical member 88 surrounded by a hollow cylindrical member 90. Cylindrical members 88, 90 are separated by a small space such as 0.1 inch and a wiper member 92 is provided at the boundary between each of a plurality of compartments provided in the space between the cylindrical members 88, 90. A valve 86 is provided to control the vacuum to each of the compartments so that the position of paper sheet 89 detach from drum 80 can be controlled. An enclosed plenum 96 is provided in the space between rollers 80 having a suitable relatively low vacuum applied thereto, such as the vacuum from source 73, for example. Openings are provided in line with openings in belts 82 so that the vacuum is operative to hold the paper sheet 89 to the belt and be transported by the belt. This structure is typical of several sheet feed structures such as post transfer sheet feed 29, output sheet feed 35, and auxiliary sheet feed 41.

Output sheet feed 35 comprises a belt roller assembly which is actuated to feed a sheet from the sheet path from a position near the duplex drum 34 to the output sheet stacker 36. The sheet is fed along the upper surface of sheet deflector means 39 when the deflector is in its normal position (shown in full line in FIG. 1) to stacker roller means 80. Stacker roller 80 has its wiper members set so that the sheet is attracted from about the twelve o'clock position to about the six o'clock position so that the sheet is flipped over and stacked with its most recently printed side down. In some cases this does not provide the proper sheet orientation in stacker 36 and in those cases deflector means 39 is moved in response to a signal to solenoid 43 to the position shown dotted in FIG. 1 so that the sheet is stacked with the most recently printed side up.

An auxiliary sheet input 41 is provided which comprises an input sheet feed 45 which is selectively actuable to feed a sheet from the top of an input sheet stack 47. The sheet is fed to a paper transport which in the embodiment shown comprises a belt roller assembly. The vacuum and belt drive are selectively actuable to feed sheets from the input to the duplex decision point. The auxiliary input may be used to feed special sheets such as cover sheets for example into the system. The auxiliary paper transport may also be used to take sheets out of sequence and reintroduce these sheets to the sheet flow at a later time. One example of such a usage of the auxiliary paper transport is in producing a three page (or other odd number of pages) report. The first sheet has page one printed thereon and the second sheet is printed with page three. The first page is directed through the duplex paper path and the second page is directed to the auxiliary paper transport. Page two is printed on the back of page one and this sheet is then directed to the output stacker. The auxiliary paper feed is energized to move sheet two to the output stacker in synchronism with the movement of sheet one.

The imaging apparatus 126 of the specific example modulates a laser beam 142 as the beam is scanned in the raster fashion over a character space to print each character. The imaging apparatus employs known electrophotographic techniques to develop the discharged area on the surface of photoconductor drum 24 which results from the modulated laser beam 142. As the drum 24 rotates past a developer station 25, the surface is coated with a toner. The toner adheres to the discharged areas of the drum surface and is transferred to a print sheet which comes into contact with the drum 24 at the transfer station 27. The paper as so printed is advanced through the fuser station 32 where the image is fixed to the sheet.

The transfer station comprises a device such as a corona discharge device 28 to produce a charge on the back of the sheet to attract the image toner from the image forming surface of drum 24 to the sheet. Due to the transfer charge, an electrostatic bond is produced between the image forming surface and the sheet. For this reason, sheet removing apparatus 31 must be provided which is capable of separating the sheet bearing the unfused toner image from the image forming surface without damaging the unfused images which are loosely adhered to the sheet. A suitable sheet removing apparatus is that described in U.S. Pat. No. 3,784,190, which was issued Jan. 8, 1974. This apparatus uses a nozzle assembly having a plurality of nozzles mounted near the electrophotographic surface. A high velocity flow of air is produced from the nozzles for a predetermined time to detach the leading edge of the sheet from the drum. A continuing flow of air maintains the sheet closely adjacent the nozzle assembly and permits movement of the sheet to the post transfer sheet feed means. This sheet feed apparatus comprises a suitable roller 80 and associated belts as previously described.

A plurality of electrical signals is generated in the machine by control means to permit the electrical control signals to be synchronized with the mechanical movement of the sheets through the machine. Control means may comprise any suitable device for supplying control signals to perform the desired functions in accordance with the desired printing function and the output from the sensing means located throughout the processing stations and paper line of the machine. The printer may be operated as a stand alone unit and have built-in control circuits to cycle the machine through the desired steps to perform the desired printing and paper control function of the machine. The printer may also be operated on-line with a data processing system and receive the control signals from the data processing system if desired. The presently preferred embodiment for control means in systems operating on line with a data processing system comprises a microprocessor within the printer to perform the control operations. One suitable microprocessor that can be used as control means for the system is instruction execution unit (IEU) 124 as shown and described in U.S. Pat. No. 4,031,519 entitled "Printer" issued June 21, 1977 to Gerald I. Findley, which is incorporated herein by reference. Copending application Ser. No. 811,911, filed June 30, 1977, now abandoned, entitled "Raster Printer" provides for printing on a sheet either along the sheet or across the sheet and this application is also incorporated herein by reference.

The basic components of the control means are shown in FIG. 3. The control means comprises a program decoder means 130 which generates a number of signals to control various machine functions. Storage means 132 includes storage for data to be printed as well as other data. Clock and cycle control means 134 provides timing signals to synchronize the various components of the printer and control circuit means 136 provides circuits to generate control signals to control the printer components based on signals from program decoder means 130, sensors which indicate a sheet is in a predetermined position in paper line 138 and other control signals. The signals generated by control circuit means 136 control the operation of imaging apparatus 126 and the movement of sheets through paper line 138. These circuits are not shown in detail since they are standard logic circuits comprising such components as AND's, OR's and LATCHes.

The printer is controlled in response to information transmitted along with the print data from the associated data processing system. This information includes the number of pages in the document, whether a cover sheet is to be used, and whether the document is to be printed in a single side (simplex) or duplex printing mode. The control system also has data relative to the sheet size to be used and in response to this information, a table is accessed which provides control data relative to this size. The control data provides scheduling data for front side and duplex print data in the page buffer. This control data also includes timing data relative to the feed of the sheet through the duplex sheet feed path.

To get the printer ready to print a single FEED A SHEET is generated and this signal actuated feed drum 10 to feed a sheet from stack 14 to paper drum 18 and the drive is stopped when the sheet is adjacent sensor 11 on paper drum 18. A second FEED A SHEET signal is operable to feed the first sheet to staging drum 40 and on to input feed means 20 and registered at gate means 22, while a second sheet is fed to a position registered adjacent sensor 11 on paper drum 18.

When the data for an appropriate number of pages to be printed is in the buffer, printing is commenced. The image to be printed on page 1 is generated at the exposure station and the position of this page is tracked as the electrophotographic drum 24 rotates by counting the pulses from drum emitter 42 which occur at a known rate such as 720 per inch of drum rotation. When the print image is at a predetermined position relative to the transfer station, such as three inches away, gate means 22 is opened by actuating solenoid 23 and feed rolls 26 are actuated to feed the first sheet to the transfer station. The predetermined position for start of the sheet feed is chosen so that the image on drum 24 and the sheet reach the transfer station is proper orientation. Transfer corona 28 is gated ON prior to the arrival of the sheet so that the charge placed on the back of the sheet is sufficient to transfer the print image to the sheet. The sheet is separated from the drum 24 with the unfused toner image on the sheet and as this sheet is being fed to the fuser station, additional sheets are moved along to the described positions so that the second print image can be transferred to a sheet at the appropriate position. This operation continues until the first sheet reaches sensor 33 which is located a predetermined distance before duplex drum 34. The predetermined distance, such as two inches, for example, is chosen to permit actuation of the valves controlling vacuum to the duplex drum in time to have vacuum present when the sheet arrives at the duplex drum so that sheets to be duplexed can be diverted to the duplex feed path.

The sheets are tracked through the paper line by placing an indication for each sheet in a storage means at a first position in the sheet path. As the sheet progresses through predetermined other positions through the sheet feed path the indication is shifted along the storage means. One suitable storage means comprises a shift register 79 (see FIG. 8) having a number of stages equal to the possible positions through the sheet feed path. When the sheet is at the first position in the sheet feed path, an indication is stored in the first stage of the shift register—for example, a one. This indication is then shifted one stage at each of the predetermined positions in response to the sheet presence signal at that position. When the sheet reaches the "decision" position at sensor 33 the appropriate signal from the storage means is utilized to enable either the duplex or output feed means.

A number of sensors are provided along the sheet path through the printer to indicate the location of the sheets in the printer. The sensors comprise a photodetector mounted adjacent the sheet path and a light source mounted adjacent the detector. When the leading edge of the sheet comes to the light source and detector, a signal is generated which signifies to the control means that the sheet has arrived at a known position. The light and photocell could also be mounted so that the web comes between them to generate the signal.

In the embodiment shown, shift register 79 has a number of stages N equal to the number of sensors along the sheet feed path. The output of stage one of shift register 79 is combined in AND circuit 81 with the output of sensor one. When the sheet reaches sensor one, the signal conditions AND circuit 81 to energize the SHIFT input of shift register 79 and shift the indication, such as a one, to the second stage. This continues until the sheet reaches the Nth stage, which is chosen to be the "decision" sensor 33. The indication can be used to actuate the valves to divert the sheet to the duplex path for example, if a one, or to permit the sheet to continue to the output stacker, if a zero. Another control is to have two shift registers 79 A and B for each sheet. If the sheet is loaded to the input feed from paper drum 18 a one is loaded into shift register A this gives an indication to divert the sheet to the duplexing sheet feed path at the decision point. In cases where the sheet is loaded to the input feed from staging drum 40, or in case simplex printing is specified, shift register B is loaded with a one indication. This shift register output provides an indication to continue the movement of the sheet to the output stacker 36.

The printer is designed to print on a plurality of different standard size sheets within a chosen range. The length of the sheet feed path from gate means through the transfer station, fuser, duplex drum, page flipper, staging drum and input feed back to the gate means is chosen to be a common multiple of all sheet sizes it is desired to print. As an example of printing on a plurality of sheet sizes, an example is given for control of sheets 8.5, 14 and 17 inches in width. To print these sheets, the length of the paper feed path is chosen at 98.5 inches so that nine 8.5 inch sheets, six 14 inch sheets, or five 17 inch sheets can be processed in the sheet feed path and the data for this number of sheets must be scheduled for duplex printing.

The size of the sheet being processed is indicated to the printer along with the data from the data processing system or the data can be entered by the operator. When this size paper is loaded adjustable end walls 17 in the input sheet feed means 14, 16 and wall 37 in output stacker 36 must be set to the appropriate sheet size. Alternatively, this setting may be sensed by appropriate means known in the art to enter the sheet size signal into the printer system.

Data relating to the timing of each of the sheet sizes to be processed is stored in a table and this data is read out from storage for the sheet size being processed. This data is in the form of counts of pulses from the drum emitter 42 since these pulses are proportional to the movement of sheets through the system. Thus, by counting these pulses, passage of a known sheet length can be determined. The counts stored in the table are keyed to a predetermined starting position for the sheet which in the embodiment shown is sensor 33. Sensor 33 is located in the sheet path at a position in advance of duplex drum 34 so that a decision can be made at that point and have sufficient actuation time for the appropriate valves if duplexing is desired by the time the sheet reaches duplex drum 34.

The size of the duplex drum 34 is chosen so that the longest sheet width can be accommodated on the periphery of the drum without overlapping more than two compartments and for the specific sheet length examples a diameter of about twelve inches is chosen.

The table has an entry LEADING EDGE COUNT for each sheet size which determines the movement of a sheet after the leading edge of the sheet is fed by duplex drum 34 to a predetermined position. In the embodiment shown, the predetermined position is defined by sensor 61 and the position of this sensor is set so that the leading edge of the shortest sheet reaches this sensor before the trailing edge of the sheet reaches sealed compartment 68.

The leading edge count is loaded into comparator means 49 at the beginning of the operation and binary counting means 53 is advanced by pulses from drum emitter 42 when the leading edge of the sheet reaches sensor 61. The output of the counting means 53 is also coupled to comparator 49 and when an equal compare is detected, a DETACH SHEET signal is generated. The DETACH SHEET signal is coupled to valves 57, 59 to direct the high pressure to compartments 68, 70 to remove the sheet from duplex drum 34 and move it toward page flipper means 38 which attracts the sheet due to the presence of the low vacuum at the surface of sheet flipper means. The high pressure to compartments 68, 70 and the low vacuum to sheet flipper means 38 is maintained only for a predetermined relatively short time since the next sheet follows close behind. The sheets are spaced apart along the entire sheet path by a gap that varies somewhat depending on the sheet size being processed, but this gap is in the nature of two to three inches.

The trailing edge of the sheet is substantially simultaneously attracted to staging drum 40 since compartment 68 of this drum has high vacuum applied. Note that the sheet motion has been reversed and the former trailing edge is now the leading edge. The sheet is transported by staging drum 40 to a predetermined position at sensor 19. The signal generated by detection of the sheet at sensor 33 is transmitted to the control circuits to indicate that the sheet is in position to receive the printed image when it is at the transfer station and printing continues as scheduled. In the event that the sheet is not sensed at sensor 19 or sensor 11 (for a first side printing) the image is not generated since this would produce the image out of synchronism with the paper feed means. This could be due to a slight delay or to some slowdown in the paper feed path such as a paper jam. In the case of a slight delay, the image is generated when the sheet is in position and this would only result in a larger than normal gap between print images on electrophotographic drum 24. The gap that can occur between sheets before an alarm is generated is a matter of design choice.

While the invention has been particularly shown and described with reference to preferred embodiments thereof, it will be understood by those skilled in the art that various changes in the form and details may be made therein without departing from the spirit and scope of the invention.

What is claimed is:

1. A duplex printer comprising:
   means for printing an image on one side of a print sheet;
   first sheet feeding means for moving print sheets in sequence to said means for printing, said first sheet feeding means including a first selectively actuable feed means;
   second sheet feeding means for continuously moving print sheets in sequence from said means for printing to an output station; said second sheet feeding means including a second selectively actuable feed means in said path and means for producing a fixed image on said print sheet prior to said second selectively actuable feed means;
   third sheet feeding means for continuously moving print sheets from said second selectively actuable feed means to said first selectively actuable feed means;
   means for selectively actuating said second selectively actuable feed means when said print sheet is in a predetermined position in said second sheet feeding means to move said print sheet to said third sheet feeding means; and
   means for energizing said first selectively actuable feed means to feed said print sheet to said means for printing to receive a duplex image on the side of said print sheet opposite to said one side.

2. The printer according to claim 1, additionally comprising means for energizing said second selectively actuable feed means to feed said print sheet to said output station, wherein said means for energizing said first and said second selectively actuable feed means comprises means for selectively controlling vacuum and pressure forces.

3. The printer according to claim 1, wherein said first and second selectively actuable feed means each comprise a vacuum feed drum.

4. The printer according to claim 3, additionally including sheet flipping means in the sheet feed path between said first and said second vacuum feed drum.

5. The printer according to claim 3, wherein said vacuum feed drums have a plurality of separate compartments therein each having pneumatic coupling to said print sheet and means for selectively switching the relative pressure in said compartments to direct the sheet to a position by vacuum and pressure forces.

6. The printer according to claim 1, further including an auxiliary feed means and means for selectively controlling said auxiliary feed means to feed a sheet to said second sheet feeding means.

7. The printer according to claim 1, wherein said first and said second selectively actuable feed means are operable to feed a plurality of sheet sizes and means for controlling the sheets in response to a sheet size indication signal.

8. A duplex electrophotographic printer including:
   printer means for developing printed data in response to input coded data signals;
   sheet transport means for moving sheets to said printer means in sequence to receive said printed data;
   control means to develop electrical signals to control said printer means and said sheet transport means;
   said sheet transport means comprising first, second and third feeding means;
   said first feeding means comprising means for feeding a sheet to said printer means for receiving a printed data image on one side of said sheet;
   said second feeding means comprising means for feeding said printed sheets to sheet output means;
   said third feeding means comprising means for feeding said printed sheets from an intermediate point in said second feeding means in inverted orientation to an intermediate pont in said first feeding means; and means for actuating, for each sheet as it leaves said first feeding means, said second feeding means and for selectively actuating said third feeding means, in synchronism with the movement of each sheet along said second feeding means when said sheet reaches said intermediate point in said second feeding means, whereby actuation of only said second feeding means moves the sheet to said sheet output means and selective actuation of said third feeding means moves the sheet to said printer means for receiving a printed data image on the other side of said sheet.

9. The printer according to claim 8, wherein said third feeding means comprises a first and a second selectively actuable vacuum feed drum and a sheet flipper means in the sheet path between said feed drums.

10. The printer according to claim 9, wherein said printed sheet is placed in inverted orientation by selective control of vacuum and pressure forces between said feed drums and said sheet flipper means.

11. The printer according to claim 10, wherein said vacuum feed drums each have a plurality of compartments and means for selectively controlling either a vacuum or pressure to one of said plurality of compartments to direct the sheet to a predetermined positioned in said sheet path.

12. The printer according claim 8, further including an auxiliary feed means and means for selectively controlling said auxiliary feed means to feed a sheet to said second feeding means.

13. The printer according to claim 8, wherein said third feeding means is operable to feed a plurality of sheet sizes and means for controlling the sheets in response to a sheet size indication signal.

14. The printer according to claim 13, wherein said means for controlling comprises counting means and a source of pulses proportional to the movement of the sheets through said feeding means, and means for actuating said sheet movement in response to counting the predetermined number of said pulses derived from said sheet size indication signal.

* * * * *